US007653493B1

(12) United States Patent
Wang et al.

(10) Patent No.: US 7,653,493 B1
(45) Date of Patent: Jan. 26, 2010

(54) PROTEOMIC SAMPLE ANALYSIS AND SYSTEMS THEREFOR

(75) Inventors: Evelyn W. Wang, San Francisco, CA (US); Matt Brown, Watertown, MA (US); Neil Chungfat, Potsdam, NY (US); Sucharita Dutta, Fremont, CA (US); Sean Mathewson, Temecula, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 286 days.

(21) Appl. No.: 11/711,140

(22) Filed: Feb. 26, 2007

Related U.S. Application Data

(60) Provisional application No. 60/776,308, filed on Feb. 24, 2006, provisional application No. 60/841,002, filed on Aug. 30, 2006.

(51) Int. Cl.
*G01N 31/00* (2006.01)

(52) U.S. Cl. ............................ 702/23; 250/282; 702/76

(58) Field of Classification Search ................... 702/19, 702/20, 22, 23, 32, 85, 76; 250/281, 282, 250/284, 286, 287, 288; 435/6; 436/5, 173, 436/177

See application file for complete search history.

(56) References Cited

U.S. PATENT DOCUMENTS

| | | | | |
|---|---|---|---|---|
| 6,829,539 | B2 | 12/2004 | Goodlett et al. | 702/20 |
| 6,835,927 | B2 | 12/2004 | Becker et al. | 250/282 |
| 6,906,320 | B2 | 6/2005 | Sachs et al. | 250/282 |
| 7,399,958 | B2 * | 7/2008 | Miller et al. | 250/286 |

OTHER PUBLICATIONS

2001 M. Wehofsky, et. al, "Isotopic deconvolution of matrix-assisted laser desorption/ionization mass spectra for substance-class specific analysis of complex samples," *Eur. J. Mass Spectrom.* 7, 39-46 (2001).

* cited by examiner

*Primary Examiner*—John H Le
(74) *Attorney, Agent, or Firm*—Crawford Maunu PLLC

(57) ABSTRACT

Analysis of a group of proteomic samples is facilitated. According to an example embodiment of the present invention, ion mass spectrometry data is collected for a group of samples. For each sample, at least one grouping of ions is identified and used to generate another estimated grouping of ions relating to the sample. Using these groupings, characteristics of the sample are detected.

22 Claims, 8 Drawing Sheets

PROTEOMIC SAMPLE ANALYSIS AND SYSTEMS THEREFOR

RELATED PATENT DOCUMENTS

This patent document claims benefit under 35 U.S.C. § 119(e) of U.S. Provisional Patent Application Ser. No. 60/776,308 filed on Feb. 24, 2006, and of U.S. Provisional Patent Application Ser. No. 60/841,002 filed on Aug. 30, 2006; both provisional applications entitled: "Mass Spectrometry Peak Analysis and Systems Therefor."

FIELD OF THE INVENTION

The present invention relates generally to mass spectrometry, and more particularly to the analysis of proteomic samples via mass spectrometry.

BACKGROUND

The characterization of material at the molecular and atomic level has been important to the advancement of a multitude of applications, scientific and otherwise. For example, identifying the composition of a variety of structures has been important for developing new technologies, developing new medical treatments and for learning more about the world around us.

Mass spectrometry is one approach to characterizing material, with the mass of one or more components in the material used in identifying the composition of the material and/or the quantity of a particular component in the material. In this regard, mass spectrometry has been used to identify materials, quantify known materials and to provide information about the structure, composition and properties of a variety of structures such as molecules.

Generally, mass spectrometry works by identifying the mass of different components in a material (e.g., of different molecules in a compound) as a function of the mass-to-charge ratio of ions of the component. A variety of approaches to mass spectrometry have evolved over the years, the use of which has become particularly extensive in organic applications.

One approach to mass spectrometry is matrix-assisted laser desorption/ionization, or "MALDI." In MALDI mass spectrometry, a laser is used to impart energy to a sample by directing high energy photons to the sample embedded in a matrix. The energy from the photons facilitates the release of ions from the sample. The released ions are in turn detected and used along with a time-of-flight of the ions (i.e., the time from which the laser is activated until the ions are detected) to determine the composition of the sample.

Another approach to mass spectrometry is electrospray ionization (ESI) mass spectrometry. Charged liquid droplets are formed from a sample, and ions are desolvated or desorbed from the charged liquid droplets. These ions are directed to a detector where they are detected and used to characterize the sample.

Ions detected in mass spectrometry approaches are generally plotted to a visible graph, which depicts peaks related to the quantity of ions received at a particular time. The peaks can then be used to identify components in the sample, thereby facilitating the identification of the type and quantity of material in the sample. For example, by identifying and analyzing a C12 (carbon) peak, the carbon content (e.g., C+) of the sample can be identified. By identifying the type and quantity of molecules in a sample, the sample is readily quantified.

While mass spectrometry has been useful, it is often challenging to accurately and efficiently identify samples, particularly those having a complex variety of materials. For instance, in many applications, multiple plotted peaks are located in a cluster, making it challenging to distinguish the peaks. In addition, data for a particular peak is sometimes spread out over a small range, making it challenging to identify the precise location of the peak (and thus challenging to identify the type of material to which the peak corresponds). Furthermore, analysis of spectra generated using mass spectrometry is somewhat subjective, leading to potential human error. Such analysis can also be time consuming and is generally not useful for analyzing a multitude of samples over a short period of time. These challenges have inhibited the implementation and usefulness of mass spectrometry for a variety of applications.

SUMMARY

The present invention is directed to overcoming the above-mentioned challenges and others related to the types of devices and applications discussed above and in other applications. These and other aspects of the present invention are exemplified in a number of illustrated implementations and applications, some of which are shown in the figures and characterized in the claims section that follows.

Various aspects of the present invention are applicable to the analysis of samples to ascertain information about the composition of the samples using ion mass spectrometry. In various example embodiments, such an approach is implemented using a processing arrangement to automatically characterize mass spectrometry data collected using, for example, a matrix-assisted laser desorption/ionization (MALDI) approach and/or an electrospray ionization (ESI) approach. With these approaches, a multitude of samples can be processed and characterized over a relatively short time frame.

According to another example embodiment of the present invention, a mass spectroscopy system automatically analyzes a group of proteomic samples. The system includes an ion detector to detect ions of each proteomic sample and to output ion data characterizing the detected ions. An ion data processor is coupled to receive the ion data and identifies, for each sample, at least first, second and third groupings of ions from the ion data, using at least the identified first grouping of ions to determine at least one of the second and third groupings of ions. A material characterization processor uses the identified groupings and predefined material characteristics to automatically characterize a material in each sample.

According to example embodiment of the present invention, an automatic mass spectroscopy sample analysis approach involves the determination of material characteristics of the sample using cluster points generated via ions from the sample. With this approach, ions are generated from the sample using, for example, laser excitation. The ions are detected and used to identify a first monoisotopic cluster point. Second and third isotopic cluster points are identified as a function of the monoisotopic mass-to-charge ratio and intensity of the detected ions used to identify the first monoisotopic cluster point. A Gaussian fit is applied over the first, second and third cluster points to fit a curve thereto, and a fourth mass-dependent isotopic pattern point is determined as a function of the curve fit. Characteristics such as composition and quantity of a material in the sample are then automatically determined as a function of the first, second, third and fourth points, and a result indicative of the characteristics is outputted.

In another example embodiment of the present invention, samples are automatically analyzed via ion mass spectrometry and a processor-based material identification approach. Ions are detected from a sample using, for example, a mass spectrometry approach such as electrospray ionization (ESI). The detected ions are used to identify a primary peak that corresponds to a mass of a particular material in the sample, and to identify a secondary peak that is a selected distance away from the primary peak. An intensity is subtracted from the secondary peak as a function of a predefined formula, and the result is added to the primary peak via deconvolution to determine a resulting peak. The resulting peak is used to automatically determine material in the sample, and a result characterizing the automatically determined material is output for analysis. In some applications, this approach is implemented with a proteomics application, with the sample including one or more proteins that are identified.

In another example embodiment, a processor arrangement including one or more processing components is implemented to automatically analyze samples using one or more ion mass spectrometry approaches, such as those described in the preceding paragraphs, and including one or more of MALDI or ESI approaches.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings in which.

Figure 1:
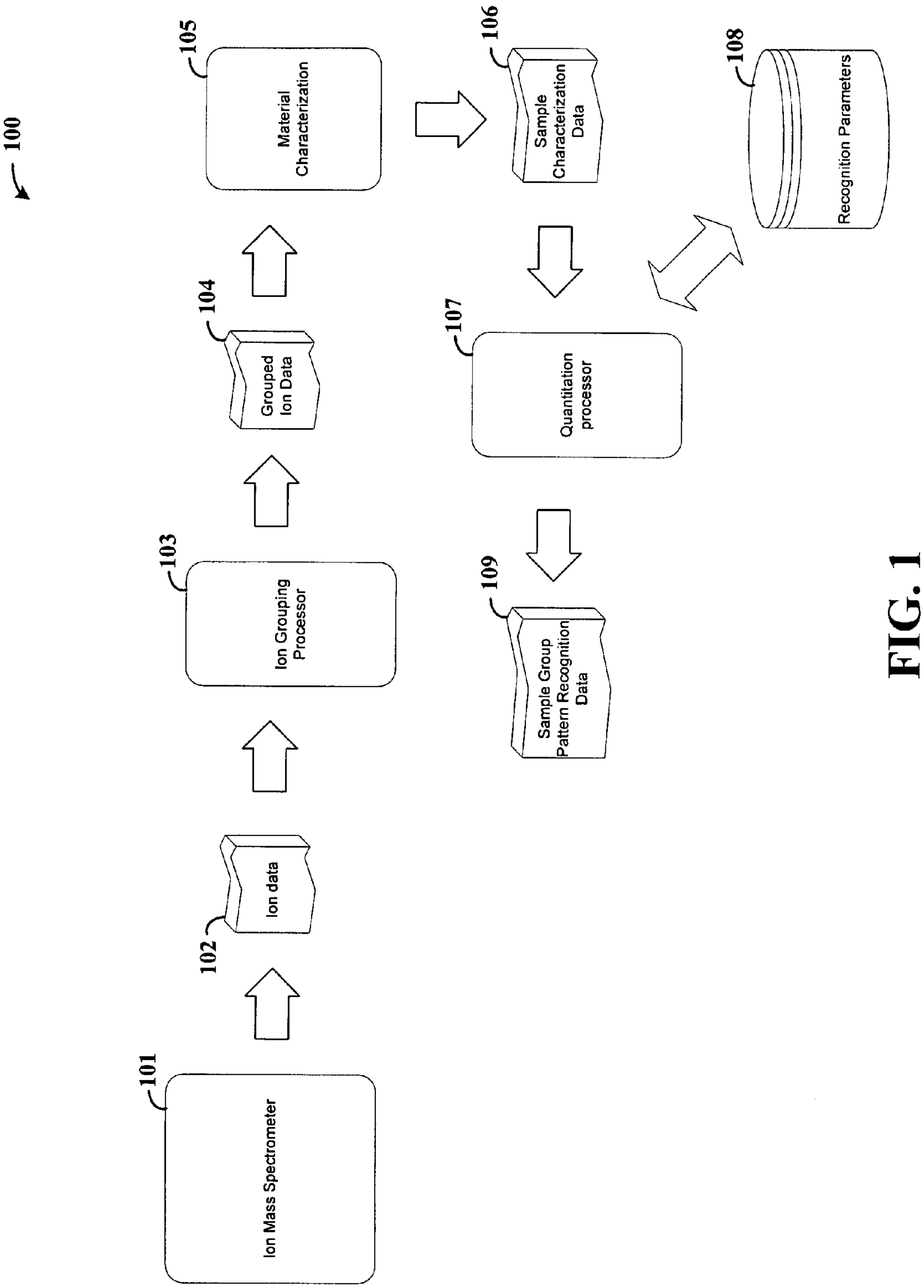
FIG. 1 shows a system for processing a group of proteomic samples, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to a variety of different types of devices and processes, and the invention has been found to be particularly suited for the analysis of small objects such as molecules using mass spectrometry. While the present invention is not necessarily limited to such applications, various aspects of the invention may be appreciated through a discussion of examples using this context.

According to an example embodiment of the present invention, mass spectrometry data is analyzed using an approach involving the automatic selection of grouped data such as peak and/or cluster data and the corresponding identification of sample characteristics associated with the selected data. In one application, a matrix-assisted laser desorption/ionization (MALDI) mass spectrometry approach involves estimating isotopic peaks using a combination of deconvolution and a Gaussian fit, and using the estimated peaks with monoisotopic peak data to identify mass characteristics of a sample (e.g., by interpreting an isotopic peak cluster). In another application, an electrospray ionization (ESI) trap mass spectrometry approach involves the quantization of mass spectrometry data to automatically identify peaks for a sample, and further to automatically identify characteristics of the sample using the identified peaks.

In other example embodiments, a group or groups of samples such as protein samples are analyzed using one or both of these approaches to detect (e.g., measure) quantitative changes to samples in the group with a relatively high-throughput analysis approach. This approach is applicable for labeled peptide samples analyzed on instrumentation such as MALDI, ESI-Trap or other mass spectrometry instrumentation, and in some instances, utilizes cost-effective O16/O18 labeling methods. For certain applications, the analysis of spectra is focused on regions of interest to rapidly identify peak masses to characterize or "fingerprint" a condition or state of a sample (or group of samples). In some applications, this approach is used as a research tool to facilitate an initial identification of proteomic profiles that define disease progression or status of cell, body fluid, serum/plasma, or tissue samples.

In some embodiments, two or more types of instrumentation that use distinct ionization sources are used to analyze a particular group of samples such as peptides. For instance, MALDI and ESI trap approaches can be used as described above, with detected ions used to provide a comprehensive overview of the quantitative changes that are present based upon the differences in ionization of each sample. Desirable aspects of each of these two or more approaches are thus realized in the quantitative analysis of a group of samples.

In another example embodiment, a range tool (e.g., a software-implemented processor tool) is used to facilitate the detection of ion peaks or clusters as described above. Generally, the range tool is used to determine the presence or absence of peaks of specific mass or mass range in a particular spectrum, while generally avoiding peaks that relate to background or noise. In certain applications, this approach facilitates the detection of peaks or clusters without necessarily scanning an entire spectrum, speeding the analysis process for the group of samples.

The approaches described herein are selectively implemented in one or more of a variety of applications benefiting from the identification and quantitation of samples analyzed via mass spectrometry. Certain examples are described here and are followed with discussion characterizing specific approaches to MALDI and ESI trap ionization approaches, as well as discussion characterizing the figures. These following discussions may be implemented to facilitate one or more of these applications, as well as a variety of others relating to mass spectrometry analysis, and for many applications, for rapid high-throughput analysis of a multitude of samples for pattern recognition, experimentation, disease tracking and other implementations.

One such application involves the determination of relative protein quantities in complex samples to elucidate the identification of biomarkers in human disease or disorders. For instance, by accurately and automatically identifying a particular peak or peaks for a sample using peak estimation and related correlation to known and/or expected material properties, that sample is readily identified. When multiple samples are analyzed using this approach, such peaks are readily compared and used to identify differences or changes, such as for identifying the change in protein level between two samples.

Other applications are directed to the analysis of standard biological samples derived from various sources such as cell lysates, tissue homogenates, partially purified material including gel or chromatographic strategies and recombinant proteins. This analysis is made for a variety of reasons, such as to identify protein and comparative quantitative changes, to determine whether modification is present on peptide(s), and/or to identify marker peaks. Two example research applications involve obtaining further understanding or identification of mechanisms of disease or activation of pathways.

Another application is directed to relatively high throughput drug screening or drug effectiveness analysis. By processing many samples at a relatively rapid rate, changes in the levels of proteins upon drug treatment are detected. For instance, this approach can be used to determine the effectiveness of a drug for a specific target protein or pathway (e.g., success or failure), and can facilitate the identification of other non-intended targets, which can provide faster determination of drug development strategies.

Still another application is directed to disease diagnostics to identify known signature peaks for a condition or state from a sample. The identification is used to provide the status or progression of the disease and, in some instances, this information is used to facilitate the determination of treatment strategies. Such an approach may be implemented, for example, in a manner not inconsistent with that shown in FIG. 6 and described below.

As discussed above, various approaches to mass spectrometry analysis involve the use of matrix-assisted laser desorption/ionization (MALDI) mass spectrometry. In one example embodiment of the present invention, a MALDI mass spectrometry approach is implemented for determining mass characteristics of a sample or group of samples as follows. A laser is directed to a mixture including the sample (e.g., the mixture including a matrix with an analyte). Energy from the laser is used to cause desorption (e.g., vaporization) and ionization of the sample. The ions are accelerated using an electric field and arrive at a detector, with the time of flight of the ions related to their mass-to-charge ratio (m/z). An amount of ions that arrive at the detector at a particular time thus corresponds to a particular mass associated with the ions.

Using an output from the detector, a first monoisotopic peak for the sample is obtained, and second and third isotopic peaks are then obtained (e.g., determined) using the mass-to-charge ratio, as related to the flight time of the ions to arriving at the detector, and intensity of the monoisotopic peak. The second and third isotopic peaks may, for example, be calculated in accordance with the approach described by M. Wehofsky, et. al, "Isotopic deconvolution of matrix-assisted laser desorption/ionization mass spectra for substance-class specific analysis of complex samples," *Eur. J. Mass Spectrom.* 7, 39-46 (2001), which is fully incorporated herein by reference.

A fourth isotopic peak is obtained (e.g., determined) using a Gaussian fit approach with the first, second and third peaks. These four clustered peaks are then used to generate a peak that better represents the ions corresponding to the cluster of peaks, and accordingly to determine mass characteristics of the sample. These mass characteristics are used to facilitate the identification of the material in the sample. For instance, this approach can be used to estimate and identify a peak corresponding to an isotope of a particular atom, such as the C12 (carbon) peak.

The Gaussian fit is applied in one or more of a variety of manners. In certain applications, an equation such as the following is implemented to fit a peak for the fourth pattern point:

$$y = \sum_{i=1}^{n} \alpha_i e^{\left[-\left(\frac{x-b_i}{c_i}\right)^2\right]}$$

where a is the amplitude, b is the centroid (location), c is related to the peak width, n is the number of peaks to fit, and $1 \leqq n \leqq 8$.

In another example embodiment, the above-discussed approach involving four peaks further includes smoothing and distinguishing the peaks from noise. Resulting peak data (e.g., with reduced noise) is deconvoluted from the spectra data to reduce the isotropic cluster (second, third and fourth peaks) to a single peak with a monoisotopic value.

In some applications, a smoothing and distinguishing approach involves identifying mass spectrometry peak differences as pairs using a specified tolerance applied to the developed peak using the deconvoluted spectral data. One such quantitative application uses 16O/18O labeling approaches, in which mass peak differences of 2 Da or 4 Da occur. These 2 Da or 4 Da peak differences are identified as pairs using a specified tolerance as discussed above. In some applications, peaks having a signal-to-noise ratio of less than three, in addition to being 2 Da or 4 Da apart, are identified as pairs. These pairs are selectively combined to form a common peak with combined intensity.

According to another example embodiment of the present invention, an electrospray ionization (ESI) trap mass spectrometry approach is implemented for determining mass characteristics of a sample or group of samples as follows. An electrospray arrangement introduces charged liquid droplets of the sample, and ions are desolvated or desorbed from the charged droplets. An ion trap traps the desolvated or desorbed ions, and selectively directs trapped ions to a detector that detects the ions and generates an output that characterizes the detected ions (e.g., in quantity and time) for analysis. The output is generally non-instrument specific and in a format amenable to processing (e.g., in an ASCII format).

The output generated by the detector is sent to an ESI processor, which deconvolutes the data to reduce isotopic clusters to a single peak with a monoisotopic value that is amenable for use in characterizing the sample. The ESI processor is programmed using, for example, the Perl language, to produce the monoisotopic value using peak and peptide charge data (e.g., extracted using a tool such as the DataAnalysis™ tool available from Bruker Daltonics of Billerica, Mass.). The ESI processor thus works with general data (e.g., ASCII as discussed above) from different types of ESI trap arrangements, and is selectively programmed to process instrument-specific data (e.g., from ESI trap arrangements providing specific or otherwise non-general data).

In some applications, this ESI trap approach is amenable to use with 16O/18O labeling approaches (i.e., 16O/18O peptide ion ratios) in which mass peak differences of 2 Da or 4 Da occur and which can be identified as pairs with a user-supplied tolerance applied to the deconvoluted spectral data. Various peaks are smoothed and distinguished from noise, and the resulting peak data (e.g., with reduced noise) is deconvoluted from the spectra data to reduce the peaks to a single peak with a monoisotopic value.

In some applications, a smoothing and distinguishing approach involves identifying mass spectrometry peak differences as pairs using a specified tolerance applied to the developed using the deconvoluted spectral data. One such quantitative application uses 16O/18O labeling approaches as discussed above, in which mass peak differences of 2 Da or 4 Da occur. These 2 Da or 4 Da peak differences are identified as pairs using a specified tolerance as discussed above. In some applications, peaks having a signal-to-noise ratio of less than three, in addition to being 2 Da or 4 Da apart, are identified as pairs. These pairs are selectively combined to form a common peak with combined intensity.

Once peaks are processed and ready for analysis, the ESI processor identifies the peaks that are 2 Da or 4 Da apart, which are then linked to peptides using, for example, data generated with a MASCOT application available from Matrix Science of Boston, Mass., which uses mass spectrometry data to identify materials (e.g., proteins).

For general information regarding the analysis of materials, and for specific information regarding approaches to mass spectra analysis, aspects of which may be implemented in connection with one or more example embodiments described herein, reference may be made to L. Jiang and M. Moini, *Development of Multi-ESI-Sprayer, Multi-Atmospheric-Pressure-inlet Mass Spectrometry and Its Application to Accurate Mass Measurement Using Time-of-Flight Mass Spectrometry*, Anal. Chem., 20-24, 72 (1), (2000), which is fully incorporated herein by reference.

Turning now to the Figures, FIG. 1 shows an arrangement 100 for automatic mass spectroscopy analysis of a group of proteomic samples. The arrangement 100 includes an ion mass spectrometer arrangement 101 to detect ions of each proteomic sample and to output ion data 102 characterizing the detected ions. An ion grouping processor 103 receives the ion data 102 and identifies, for each sample, at least first, second and third groupings of ions from the ion data, using at least the identified first grouping of ions to determine at least one of the second and third groupings of ions. For instance, a first grouping of ions may be detected from the ion data 102, and one or more other grouping of ions can be estimated using the first grouping of ions together with other data, curve fits or processing approaches. The ion grouping processor 103 provides grouped ion data 104 to a material characterization processor 105 that uses the identified groupings and predefined material characteristics to automatically characterize a material in each sample and provide sample characterization data 106 regarding the same.

In some embodiments, the sample characterization data is then used by a quantitation processor 107, together with recognition parameter data 108 to recognize a pattern or other characteristic from a group of samples. Such recognized patterns or characteristics are output as data 109 that can be used, for example, in disease analysis or drug testing.

In some applications, one or more of the ion grouping processor 103, material characterization processor 105 and quantitation processor 107 are implemented with a computer processor or processor arrangement. Furthermore, for certain applications, one or more of these processor or processor arrangements may be implemented together on a common processor or processor arrangement, such as a laboratory computer system local or remote to the ion mass spectrometer arrangement 101.

Figure 1A:
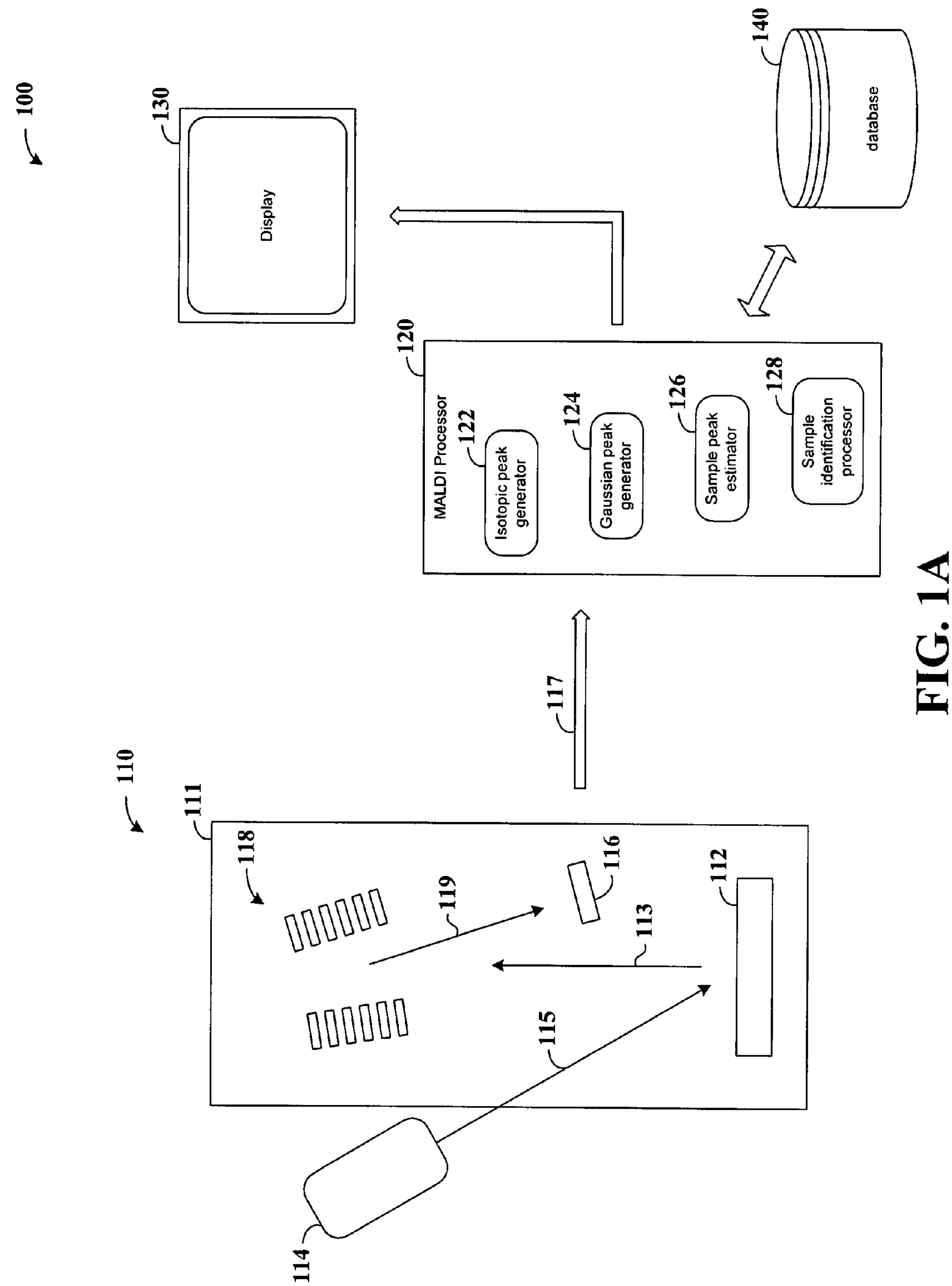
FIG. 1A shows a MALDI mass spectrometry arrangement as can be implemented, for example, in accordance with FIG. 1, according to another example embodiment of the present invention.

FIG. 1A shows a MALDI mass spectrometry arrangement 100 for detecting sample-based peaks using an estimated peak cluster, according to another example embodiment of the present invention. In some embodiments, the arrangement 100 is implemented using an approach similar to that shown in and described above in connection with FIG. 1, with a MALDI-based ion data analysis approach and processing of grouped peak or cluster ions.

The arrangement 100 includes a MALDI mass spectrometer arrangement 110 adapted to generate ions from a sample and to detect the ions for mass spectrometry analysis. The MALDI mass spectrometer arrangement 110 further provides an output corresponding to the detected ions. A MALDI processor 120 is adapted to process the output data from the mass spectrometry arrangement to identify a peak or peaks that correspond to the composition of the sample.

The mass spectrometer 110 includes a vacuum chamber 111 and a laser 114, and interfaces (e.g., via a wired or wireless connection) for providing data to the MALDI processor 120. A sample holder 112, reflector 118 (e.g., an ion mirror) and a detector 116 are located in the vacuum chamber 111.

The sample holder 112 is adapted to hold a variety of different samples for analysis in one or more of a variety of manners. For instance, where the sample is an analyte in a mixture with a matrix and cation materials, the sample holder 112 is adapted to hold the mixture in a manner that is receptive to laser stimulation. Where a particular type of analysis is desired, such as for peptide or biomarker identification, the sample holder 112 can be selectively tailored to the particular application.

The laser 114 is arranged to direct laser light 115 to the sample in the sample holder 112, and the laser light 115 (e.g., pulsed) is used to excite the sample and generate a plume of ions 113 that are directed towards the reflector 118.

The reflector 118 is arranged to redirect ions 119 from the plume of ions 113 towards the detector 116. In general, the reflector 118 includes one or more of a variety of arrangements, such as an ion mirror powered appropriately to direct the reflected ions 119 to the detector 116. In other applications, the reflector 118 is omitted, with the ion plume 113 directed towards the detector 116 (e.g., arranged in a portion of the vacuum chamber 111 near the shown location of the reflector 118).

The detector 116 detects the reflected ions 119 (or ions otherwise arriving at the detector) and generates an output signal 117 that is passed to the MALDI processor 120. In most applications, the output signal 117 is an ASCII type signal that is not necessarily specific to the mass spectrometer 110.

The MALDI processor 120 includes an isotopic peak generator 122, a Gaussian peak generator 124 and a sample peak estimator 126 to generate and process peak data, each of which is selectively implemented using, for example, a software-driven processor or processors that carry out tasks. The MALDI processor 120 further includes a sample identification processor 128 that automatically identifies samples using peak data.

The isotopic peak generator 122 uses the raw data 117 to generate two additional isotopic peaks for a particular monoisotopic peak using the mass-to-charge ratio of ions characterized in the raw data (e.g., as discussed in examples above). The isotopic peaks are thus automatically generated, with data associated with the isotopic peaks stored in a database 140 (or other data storage arrangement) for use in further processing.

The Gaussian peak generator 124 uses a monoisotopic peak and its associated isotopic peaks generated with the isotopic peak generator 122 to fit a Gaussian curve over the peaks. A fourth peak is thus estimated with the Gaussian peak generator 124 and stored (e.g., in the database 140 or otherwise.

A cluster of peak data is thus made available for a particular component in a sample detected in the mass spectrometer 110 as including the isotopic peaks generated with the isotopic peak generator 122, the fourth (Gaussian) peak generated with the Gaussian peak generator 124 and their associated monoisotopic peak. The sample peak estimator 126 uses this clustered peak data to estimate an actual peak (e.g., a C12 peak) for the sample being analyzed.

Once one or more sample peaks are estimated, the sample identification processor 128 uses the estimated peak or peaks to identify, quantify or otherwise characterize the sample at the sample holder 112. For example, by comparing the estimated peak to predefined peaks corresponding to samples as defined in a lookup table or similar data configuration (e.g., stored in the database 140), the identification processor 128 can match the estimated peak to a particular material, thereby identifying a component of the sample. In other applications, the sample identification processor 128 is programmed to use the peak data to automatically generate an output that corresponds to a known peak for a known material. Such an output may, for example, correspond to a mass spectrometry plot showing the estimated peak with relatively little or no noise or nearby peaks, facilitating the identification of the location (and corresponding mass-to-charge ratio) of the estimated peak.

The identified component or components of the sample undergoing mass spectrometry in the mass spectrometer 110 are then communicated to a user or users via an interface such as a display 130 or other appropriate device. Where appropriate, many samples can be tested in relatively short succession, with the output generated for users identifying components in each sample. In this regard, users need not necessarily review raw peak data directly and make subjective decisions as to one or more peaks shown in the raw peak data.

A variety of programming and processing approaches are implemented for peak identification in connection with various example embodiments. In one implementation, and referring to FIG. 1A by way of example, a standalone software application is built into the MALDI processor 120 using, for example, MATLAB framework available from The MathWorks of Natick, Mass. Peak-picking is performed using a combination of algorithms to smooth and distinguish peaks from noise (e.g., at isotopic peak generator 122 and/or at Gaussian peak generator 124). Resulting data from spectra are deconvoluted to reduce isotopic clusters to a single peak with a monoisoptopic value (e.g., at sample peak estimator 126) that is amenable for use in characterizing the sample from which the peak data was obtained.

According to another example embodiment of the present invention, a mass spectrometry arrangement is programmed and adapted to process mass spectrometry data for proteome applications. The mass spectrometry arrangement generates raw data characterizing ions using, for example, one or more of the approaches discussed above and/or shown in the figures (see, e.g., FIG. 1A). One or more of a variety of mass spectrometers implementing various approaches is used to generate the raw data, with the raw data being output in a non-instrument specific format (e.g., in an ASCII format).

A proteome-based processor such as the MALDI processor 120 of FIG. 1A uses the raw data to generate an output that facilitates the characterization of the raw mass spectrometry data, such as via the generation of reports, graphs and/or other information readily comprehended by users. The proteome-based processor reads and formats the raw data (e.g., hyper text markup language, HTML) from a MALDI mass spectrometer to generate a spreadsheet. In some implementations, a quantitation report is generated using the spreadsheet. Using the processed raw data, "zero lists" of proteins that have not changed between a control group and experiment group are selectively generated to facilitate analysis. Data from two different MALDI procedures ("runs") is processed with internal data structures, with one run compared to the other to facilitate the removal of redundant hits, with the Excel report showing the results.

In connection with these approaches, various software applications are used with the MALDI processor 120, such as the HTTPClient and HSSFUserModel packages available from the open-source Jakarta Project (software available at jakarta.apache.org), which is part of the Apache Software Foundation, a non-profit Delaware corporation. The HTTPClient package facilitates the creation of "NVPairs," used with the submission of data files created in a MALDI batch run (e.g., to a MASCOT application as discussed above). The HSSFUserModel package is implemented to format data in a particular spreadsheet format.

Figure 1B:
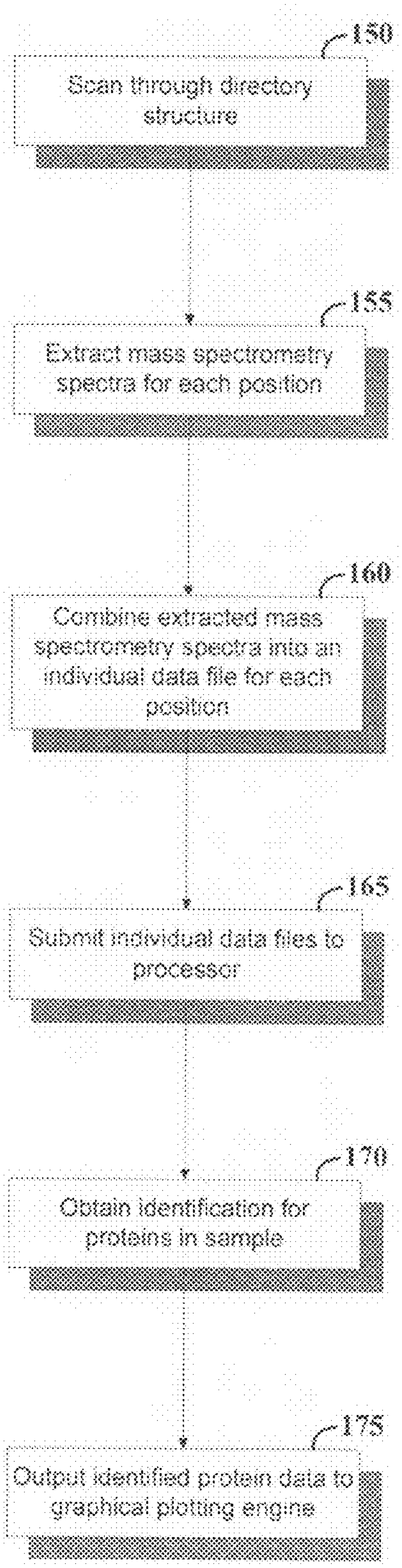
FIG. 1B shows an approach to processing mass spectrometry data using an arrangement such as that shown in FIG. 1A, according to another example embodiment of the present invention.

FIG. 1B shows an approach to processing mass spectrometry data as discussed in the preceding paragraphs using, for example, an arrangement such as that shown in FIG. 1A with a MASCOT application, according to another example embodiment of the present invention. At block 150, a directory structure containing MALDI fractions for a particular mass spectrometry run or runs is scanned. At block 155, mass spectrometry spectra for each position undergoing analysis is extracted, and the extracted data is combined into data files (e.g., ".mgf" files for MASCOT) at block 160. The combined data files are submitted to a processor implementing the MASCOT application at block 165. Protein identifications are automatically obtained at block 170, and an output characterizing the protein identifications is generated at block 175.

In some implementations, a browser interface is configured to allow users of the proteome-based processor to intuitively interact with data (e.g., generated using a MASCOT application as discussed above). The interface allows users to preview a raw data file to work with, and interact with various processing components including those discussed above.

In some applications, a Microsoft .NET framework written in Microsoft's Visual C# Express Edition is programmed into the proteome processor and operates by taking data directly from a data file (i.e., with the extension ".dat") generated using a MASCOT application as discussed above. This approach facilitates interaction with the data file without necessarily parsing an HTML (".html") file and/or reading data out of previously generated spreadsheets. The data file is stored as an ArrayList of "hit" objects including mass spectrometry sample information such as accession number, protein name, score, and mass. This approach is selectively implemented using an approach similar to that shown in FIG. 1B.

According to another example embodiment of the present invention, a mass spectrometry graphical plotting approach involves the generation of user-friendly data from a delimited text file (e.g., containing results of an O-18 labeling experiment). Such a text file may, for example, be implemented with a CSV (comma-separated value) output containing identified pairs at 2 Da or 4 Da apart in a MALDI deconvoluted spectrum. This approach is implemented using a processor such as the MALDI processor 120 shown in FIG. 1A. When implemented with protein samples, the processor generates a graphical report showing a fold change in protein expression plotted against the sample specie's mass-to charge (m/z) value.

In some applications, the mass spectrometry graphical plotting approach is implemented with a MATLAB script that generates arrays of numbers based on the contents of the text file, with "UP" and "DOWN" regulation represented as an array of values of 1 or −1. Hits (i.e., results for a particular material) are determined by reading each row and checking for the presence of text containing a protein name and accession number. A hits matrix is generated by assigning a value of 0 (if no hits are present) or 1 (if hits are present) to an appropriate row of the hits matrix. The m/z values are pulled directly from the text file, as is the fold change in regulation. The hits, regulation, and fold change matrices are multiplied component-wise to provide y-coordinates for a plot (e.g., using MATLAB), while the m/z values serve as the x-coordinate points.

Figure 2:
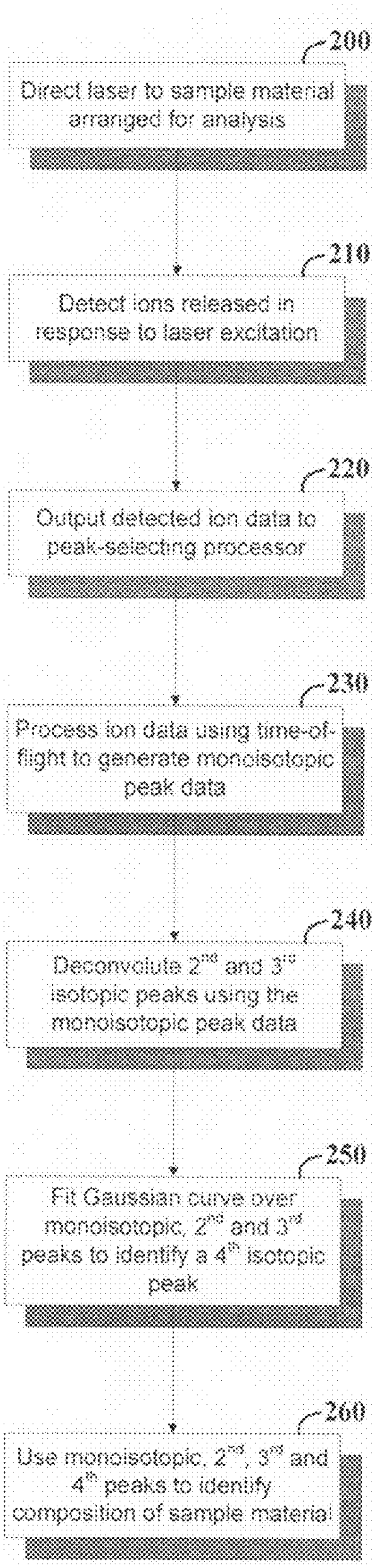
FIG. 2 shows a flow diagram for processing MALDI data, according to another example embodiment of the present invention.

FIG. 2 shows a flow diagram for processing MALDI data, according to another example embodiment of the present invention. At block 200, a laser is directed to a sample material arranged for analysis. As discussed above, such sample material may include an analyte in a matrix. At block 210, ions released in response to excitation by the laser are detected, and output data characterizing the detected ions is sent to a peak-selecting processor at block 220. The steps in blocks 200-220 are implemented, for example, using one or more of a variety of mass spectrometers, with the output at block 220 coupled to an appropriate processor or, in some applications, processed using an integrated mass spectrometry/processing arrangement.

At block 230, the detected ion data is processed using a time-of-flight type of analysis to generate monoisotopic peak data characterizing the sample. Second and third isotopic peaks are deconvoluted at block 240 using the monoisotopic peak data generated at block 230. At block 250, a Gaussian curve is fit over the monoisotopic, second isotopic and third isotopic peaks to identify a fourth isotopic peak. Once all four peaks have been obtained, they are used to automatically identify the composition of a sample material at block 260, via the generation of a representative peak corresponding to a particular material from which the four peaks were obtained.

The approaches described herein are selectively implemented in one or more of a variety of applications benefiting from the identification and quantitation of samples analyzed via mass spectrometry. One such application involves the determination of relative protein quantities in complex samples to elucidate the identification of biomarkers in human disease or disorders. For instance, by accurately (and automatically) identifying a particular peak or peaks for a sample, that sample is readily identified. When multiple samples are analyzed, such peaks are readily compared and used to identify differences or changes, such as for identifying the change in protein level between two samples.

Figure 3:
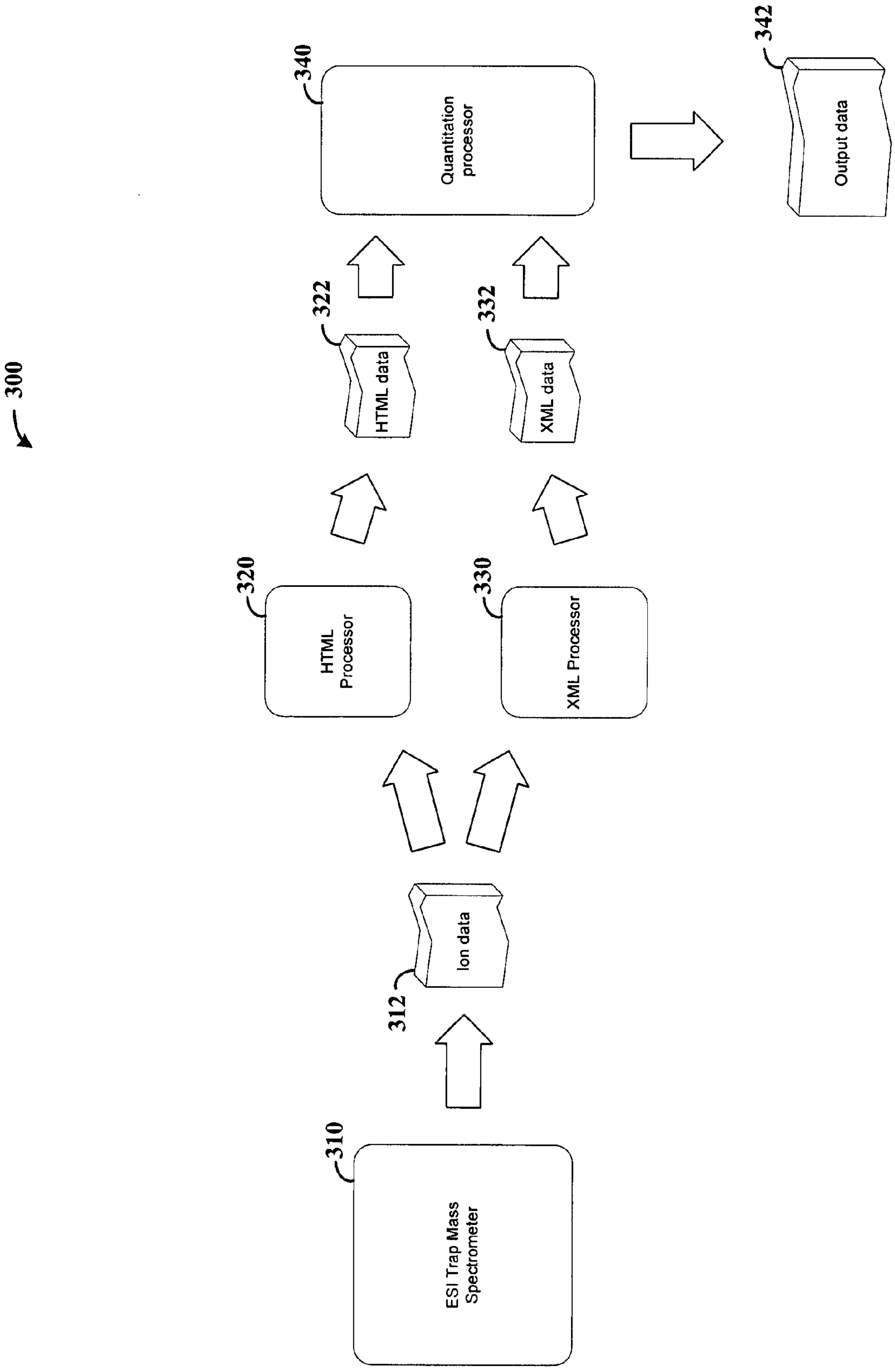
FIG. 3 shows an ESI trap arrangement, according to another example embodiment of the present invention.

FIG. 3 shows an ESI trap arrangement 300 adapted for automatically identifying mass spectrometry sample composition, according to another example embodiment of the present invention. For certain embodiments, the arrangement 300 is implemented in a manner similar to that shown in and described in connection with FIG. 1 above.

The arrangement 300 includes an ESI trap mass spectrometer 310, an HTML processor 320 and an XML processor 330 that generate data from raw mass spectrometry detector data, and a quantitation processor 340 that quantifies data from the HTML and XML processors for use in characterizing material detected in the ESI trap mass spectrometer.

When a sample is analyzed in the ESI trap mass spectrometer 310, raw detected ion data 312 is passed to the HTML and XML processors 320 and 330, which respectively process the raw data to generate HTML data 322 and XML data 332. In some instances, the raw detected ion data is of a format amenable for use by a MASCOT application as discussed above, yet generally non-specific as to the type and/or manufacturer of the ESI trap mass spectrometer 310.

Figure 4:
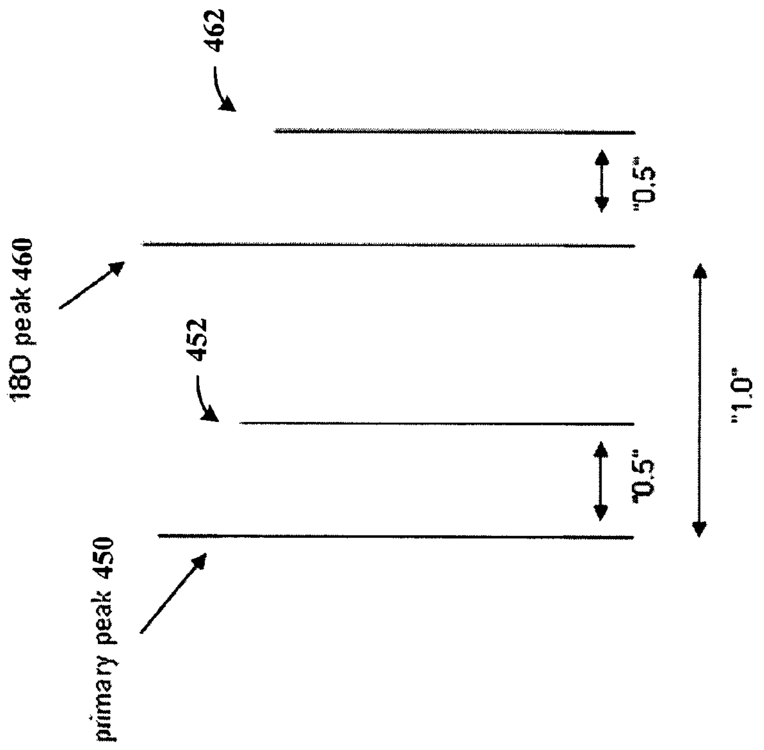
FIG. 4 shows a graphical approach to analyzing materials, such as with the ESI trap arrangement of FIG. 3 and/or approach in FIG. 1, according to another example embodiment of the present invention.

The quantitation processor 340 identifies a primary peak that corresponds with a peptide mass from the XML data 332, and looks for a secondary peak that is a selected distance away as follows: a distance of "0.5" for a +2 charge, a distance of "0.33" for a +3 charge and a distance of "0.25" for a +4 charge. If a secondary peak exists, the quantitation processor subtracts an intensity from the secondary peak based on a predefined formula, and adds it to the primary (e.g., using a similar approach to the deconvolution approaches discussed above). The resulting peak is used as a indication of the sample (e.g., a peptide) from which the ion data 312 was obtained. In some implementations, the quantitation processor also looks for a third peak and performs intensity manipulation as discussed with the second peak above when a third peak is present. The quantitation processor 340 then begins the search for the 18O peaks, which are a mass difference of 2 and 4 Da apart by using "1" for the +2 charge, "0.66" for the +3 charge, and "0.5" for the +4 charge to define distances between the two primary peaks. The quantitation processor 340 then generates output data 342 in a format that characterizes fold change and direction (i.e., up or down). FIG. 4 shows one example pair of primary and secondary peaks (450, 452 and 460, 462) that can be processed using this approach.

Figure 5:
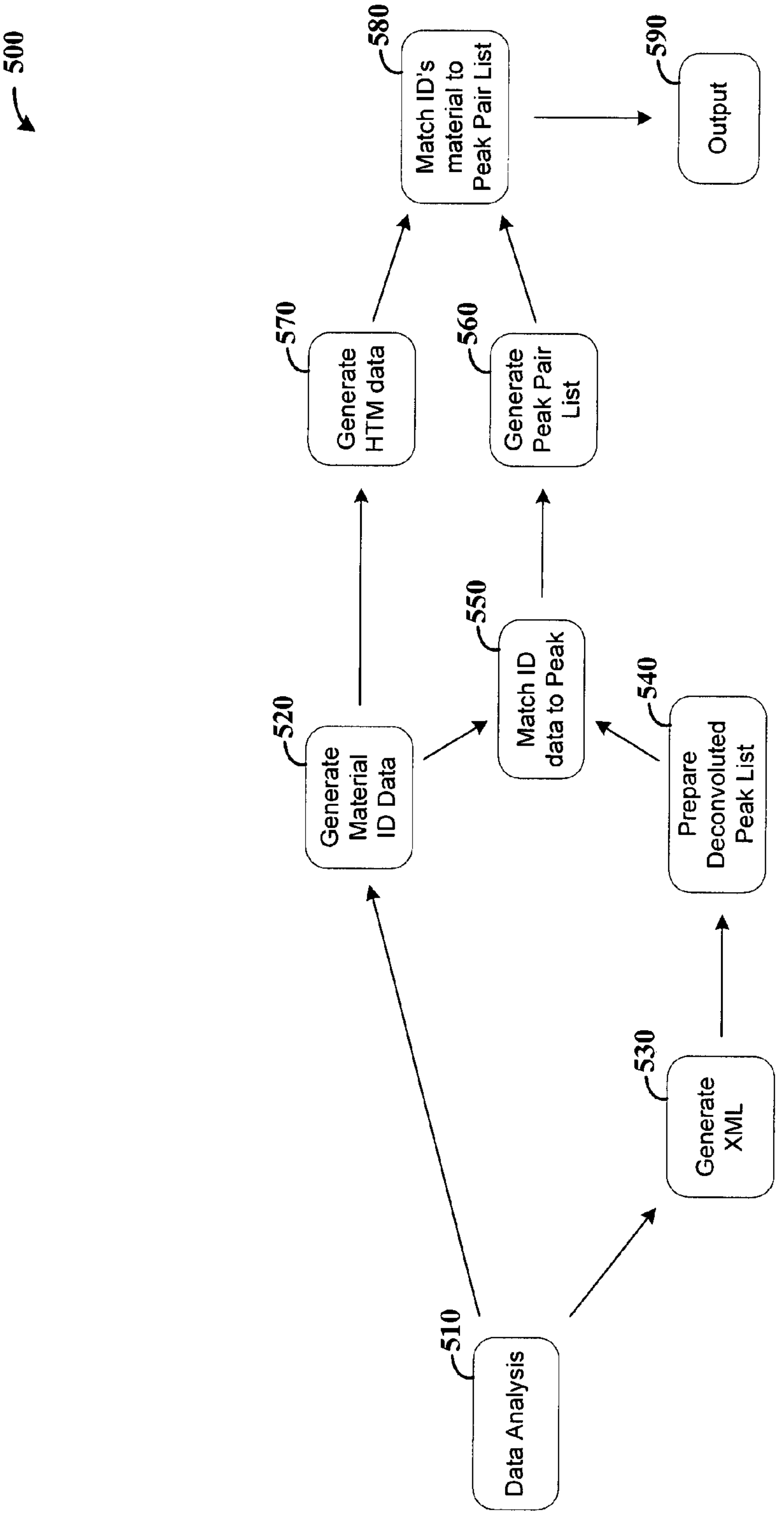
FIG. 5 shows an approach to processing mass spectrometry data using an arrangement such as that shown in FIG. 3, according to another example embodiment of the present invention.

FIG. 5 shows an approach 500 to processing mass spectrometry data using an arrangement such as that shown in FIG. 3, according to another example embodiment of the present invention. Peak data collected using an ESI trap arrangement, such as the ESI trap arrangement 300 shown in FIG. 3 and/or as otherwise described or referenced herein, is analyzed at block 510 for a particular specimen of interest (e.g., a specimen including protein(s)). In the analysis, spectra information characterizing the strength, or number, of ions arriving over time is presented for the analysis. In some applications, proteins in the specimen are quantified (via this spectra information) with the approach shown in FIG. 3 using a software-based approach using a combination of software such as the DataAnalysis™ tool described above, the MASCOT software described above, and the Perl language (a general purpose programming language).

At block 520, material ID data is generated using the data analysis at block 510. For example, where a MASCOT software approach as described above is implemented, an "MGF" file including a list of charged ions present in the spectra obtained for a specimen undergoing analysis is generated from the data analysis at block 510. This data is made available for analysis as described below.

At block 530, an XML file including raw spectra is generated using the data analysis at block 510, with the raw spectra data divided into separate time periods. At block 540, a deconvoluted peak list is generated using the raw spectra data with corresponding time periods from the XML file generated at block 530. Generally, a pattern or patterns that exhibits the presence of peaks for material being analyzed (e.g., peptide peaks) is recognized.

Using the material ID data generated at block 520 and the deconvoluted peak list generated at block 540, a mass from the ID data is matched to the peak list at block 550. Using the matched ID and peak information, a peak pair list is generated at block 560, pairing closely-situated peaks. For instance, a user-defined tolerance may be implemented at block 560 to associate peak pairs having a deconvoluted mass peak difference of 2 Da or 4 Da as discussed above.

In one embodiment, the XML file is deconvoluted at block 540, matched at block 550 and analyzed at block 560 to determine a certain pattern that shows the presence of peaks of predefined interest, with such a pattern defined as having a pair of points that are a specific distance apart. In one implementation, peaks at a distance of 0.5 for a +2 charge, 0.33 for a +3 charge, and 0.25 for a +4 charge are respectively deconvoluted. The first point is stored as the location of the peak, and the sums of the signal to noise ratios for the peaks are stored as the intensity. Each time period for the raw data generated at block 530 is deconvoluted separately. The list prepared at block 540 is scanned to identify pairs of deconvoluted peaks that are a specific distance apart as follows: for O16/O18 labeled peak pairs, the distance is 1 for a +2 charge, the distance is 0.66 for a +3 charge, and the distance is 0.5 for a +4 charge. In some applications, pairs that are +4 daltons apart at twice the value for the corresponding +2 charge distances are also detected. These peaks are used to identify a protein peak labeled by O16 and the same protein in another sample labeled by O18. The second peak can be in a different time period, with the range of time set by the user.

Referring back to block 520, the material ID data is used to generate HTM data (HTML) at block 570 to create a list of identified materials (e.g., peptides) using, for example, MASCOT software as described above. At block 580, the peak pair list generated at block 560 is matched with a list from the HTM data generated at block 570, based off the deconvoluted mass, to generate an output result 590. Using this output result 590, a change in abundance of a material (e.g., protein) is detected by way of a comparison of the relative intensity between the peaks of the pair.

Figure 6:
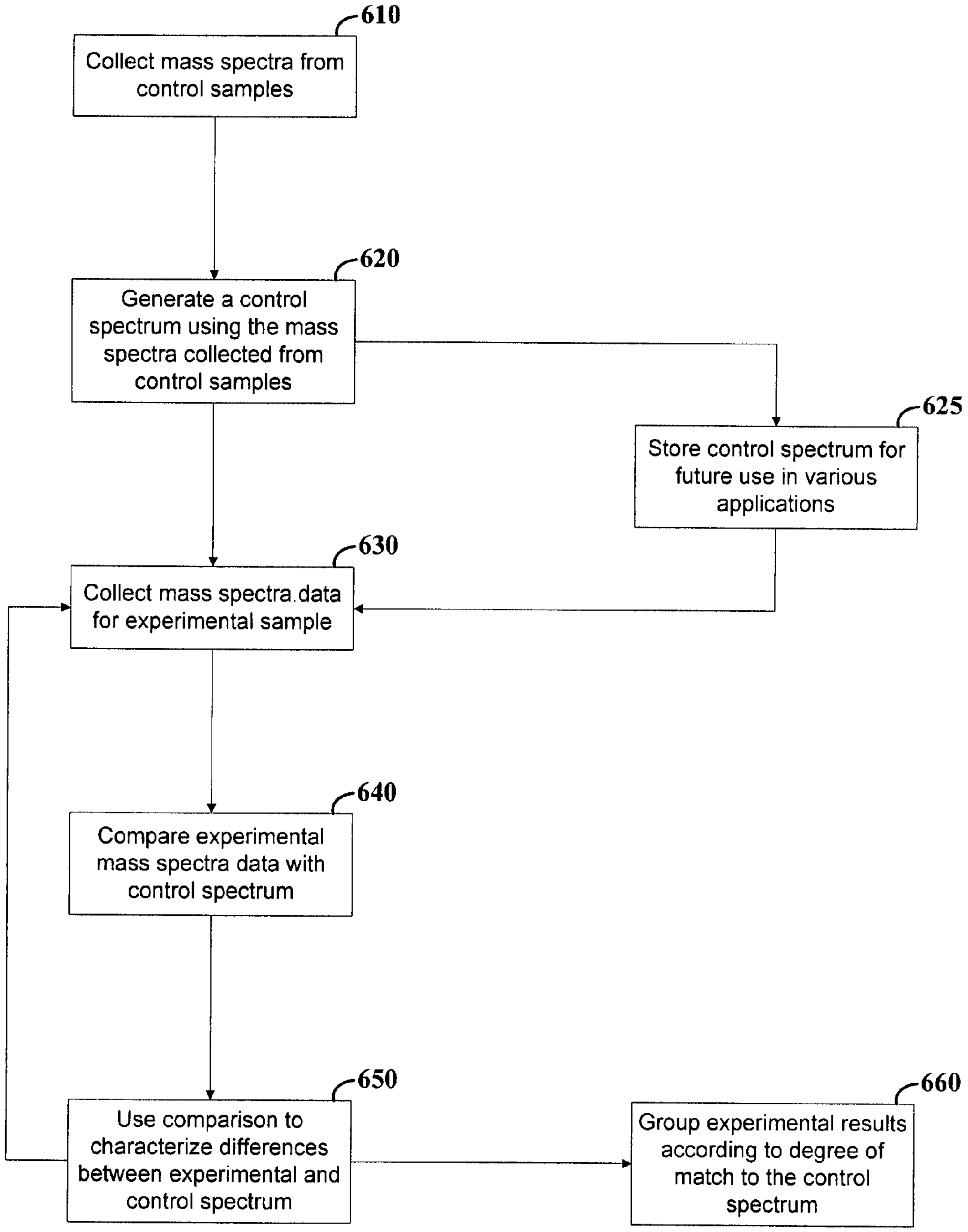
FIG. 6 shows an approach to diagnostic analysis of samples using mass spectrometry data, according to another example embodiment of the present invention.

FIG. 6 is a flow diagram for an approach to the diagnostic analysis of samples using mass spectrometry data, according to another example embodiment of the present invention. This approach may be implemented, for example, in connection with one or more of the arrangements shown in and described in connection with FIG. 1, FIG. 1A and FIG. 3 (e.g., in the quantitation processor 107 of FIG. 1). At block 610, mass spectra is collected from control samples using, for example, control samples of a known composition. At block 620, the mass spectra from the control samples are used to generate a control spectrum that is based upon two or more of the control samples. In some applications, the control spectrum includes different information from two or more control samples, with the different information combined to create a common control spectrum. This control spectrum is optionally stored at block 625 for use in additional experiments.

To analyze a sample or samples, mass spectra data is collected for an experimental sample at block 630. This collection may involve, for example, using one of the ion mass spectrometer arrangements shown in the figures, such as those used for MALDI or ESI trap approaches. At block 640, the experimental mass spectra data is compared to the control spectrum generated at block 620. At block 650, the comparison is used to characterize the experimental spectrum, relative to the control spectrum, and correspondingly to indicate differences in the material from which ions were collected, relative to the control material. This characterization is used, for example, in diagnosing disease characteristics, responses to treatment, and other characteristics of the sample undergoing experimental analysis.

In some embodiments, additional samples are analyzed, with the process continuing at block 630 in collecting mass spectra data for the additional samples, with experimental data for these additional samples compared against the control spectrum at block 640 (e.g., on a peak-by-peak basis) to determine similarities and/or differences. This comparison for the additional samples is used at block 650 to characterize differences between these samples and the control sample, facilitating analysis of a multitude of samples against the control sample. In some applications, experimental results for several samples are grouped at block 660 according to a degree of match to the control sample (e.g., samples within a determined percentage or range of matching characteristics, relative to the control sample, are grouped together).

In some implementations, the control spectrum is generated at block 620 using the MASCOT application described above, which takes the mass peaks and uses the peaks to detect the presence of proteins in the sample. The spectra are analyzed and the most popular proteins obtained are used as a baseline for finding common peaks in the control spectrum. Results from the MASCOT application are compared with the masses in the set of spectra to detect which of the MASCOT masses have corresponding matches in a majority of the known sample set. Matching masses are selectively stored as the control spectrum at block 625.

The approach shown in FIG. 6 is applicable for use with a variety of samples, and for a variety of experimental applications. For example, in some embodiments, a peak profile is determined for a sample in a known state or states (e.g., serum from healthy individuals and/or serum from individuals with an infection) for diagnosing samples. Once a peak profile is determined for a known control state, the profile is compared to samples of an unknown state, and a match (or close match) with a given profile is used to indicate the state of the sample (and, correspondingly, the source of the sample). Referring back to FIG. 6 and considering the use of two control states, one embodiment involves collecting mass spectra from two control sample types at block 610, generating a control spectrum for each sample type at block 620, and comparing experimental sample data to the control spectrum to characterize a condition of the sample at blocks 630-650.

In other example embodiments, a similar control-spectrum comparison approach is used to detect a stage of disease progression in a sample or set of samples. Information characterizing the progression of disease is used for a variety of approaches, such as to select and implement treatment or treatment strategies. In some applications, disease progression information is collected over time from one or more samples and used to provide an extensive database of spectra and, where appropriate, profiles such as marker profiles, which can be used in analysis of additional samples.

While the present invention has been described with reference to several particular example embodiments, those skilled in the art will recognize that many changes may be made thereto without departing from the spirit and scope of the present invention. Such changes may include, for example, applying one or more of the various approaches described above to a variety of different mass spectrometry applications using one or more different approaches to mass spectrometry, or to the processing of fragment ion data that results from post-translational modifications with mass spectrometry experiments. Furthermore, the present invention is applicable to a multitude of different arrangements, analysis approaches and samples. For instance, in certain embodiments, two or more of the arrangements described herein are implemented in a common arrangement, to facilitate analysis of data from electrospray ionization (ESI) approaches as well as matrix-assisted laser matrix-assisted laser desorption/ionization (MALDI) approaches. These and other approaches as described in the claims below characterize aspects of the present invention.

What is claimed is:

1. A system for automatic mass spectroscopy analysis of a group of proteomic samples, the system comprising:

an ion detector to detect ions of each proteomic sample and to output ion data characterizing the detected ions;

ion data processing means, coupled to receive the ion data and configured, for each sample, to identify at least first, second and third groupings of ions from the ion data, using at least the identified first grouping of ions to determine at least one of the second and third groupings of ions; and a material characterization processor configured to use the identified groupings and predefined material characteristics to automatically characterize a material in each sample.

2. The system of claim 1, wherein the ion data processing means is a computer system for processing ion data for a multitude of proteomic samples, and to electronically identify the groupings for each of the multitude of samples.

3. The system of claim 1, wherein the ion data processing means identifies the first grouping by identifying a first monoisotopic cluster point characterizing the first grouping, identifies the second and third groupings by using the identified first monoisotopic cluster point to determine second and third monoistopic cluster points characterizing the second and third groupings, fits a curve over the first, second and third cluster points, and identifies a fourth mass-dependent isotopic pattern point as a function of the curve, and wherein the material characterization processor uses the identified groupings and predefined material characteristics to automatically characterize a material in each sample by automatically determining a material in the sample as a function of the first, second, third and fourth points.

4. The system of claim 1, wherein the ion data processing means identifies the first grouping using the ion data to identify a primary peak that corresponds to a mass of a particular material in the sample, the primary peak characterizing the first grouping, identifies the second grouping using the ion data to identify a secondary peak that is a selected distance away from the primary peak, the secondary peak characterizing the second grouping, and identifies the third grouping by determining a resulting third peak by subtracting an intensity from the secondary peak as a function of a predefined formula and adding the result to the primary peak via deconvolution, the third peak characterizing the third grouping, and wherein the material characterization processor uses the resulting third peak to automatically determine material in the sample.

5. The system of claim 1, wherein the ion detector detects ions from distinct ionization sources, wherein the ion data processing means separately identifies said at least first, second and third groupings for ions detected from each distinct ionization source, and wherein the material characterization processor automatically characterizes a material using the identified groupings for each ionization source.

6. The system of claim 1, further including a pattern recognition processor that uses the automatic characterization of material in the samples and predefined recognition parameters to automatically recognize a proteomic pattern in the group of proteomic samples and to provide information characterizing the recognized pattern.

7. The system of claim 1, further including a pattern recognition processor that uses the automatic characterization of material in the samples and predefined recognition parameters to automatically recognize a pattern of quantitative changes to proteins in the group of proteomic samples and to provide information characterizing the recognized pattern.

8. The system of claim 1, wherein the ion data processing means identifies at least the first grouping of ions from a spectrum by determining the presence or absence of groupings of ions of specific mass or mass range in the spectrum.

9. The system of claim 1, wherein the material characterization processor uses the identified groupings and predefined material characteristics to automatically characterize a material in each sample by comparing the identified groupings for each sample to a control spectrum to characterize the material in each sample.

10. A method for automatic mass spectroscopy analysis of a sample, the method comprising:

detecting ions of the sample and using the detected ions to identify a first monoisotopic cluster point;

determining second and third isotopic cluster points as a function of the monoisotopic mass-to-charge ratio and intensity of the detected ions used to identify the first monoisotopic cluster point;

applying a Gaussian fit over the first, second and third cluster points to fit a curve thereto;

determining a fourth mass-dependent isotopic pattern point as a function of the curve fit; and by using a material characterization processor, automatically determining a material in the sample as a function of the first, second, third and fourth points and outputting a result characterizing the automatically determined material.

11. The method of claim 10, wherein automatically determining a material in the sample as a function of the first, second, third and fourth points includes estimating a monoisotopic peak using the first, second, third and fourth points and using the estimated monoisotopic peak to identify material in the sample.

12. The method of claim 11, wherein using the estimated monoisotopic peak to identify material in the sample includes automatically correlating the estimated monoisotopic peak to a monoisotopic peak for a known sample.

13. The method of claim 10, wherein automatically determining a material in the sample as a function of the first, second, third and fourth points includes displaying a substantially noise-free and isotopic peak-free graph depicting a material.

14. The method of claim 10, wherein automatically determining a material in the sample as a function of the first, second, third and fourth points includes automatically determining the material.

15. The method of claim 10, wherein two samples are analyzed via mass spectrometry, wherein automatically determining a material in the sample includes determining a material in each sample, further comprising quantitizing changes in protein level between the two samples.

16. The method of claim 10, further comprising generating the ions with a matrix-assisted laser-desorption/ionization arrangement.

17. A mass spectrometry system for analyzing material, the system comprising:

an ion detector adapted to detect ions of a sample and to generate a signal characterizing the detected ions; and a peak processing arrangement adapted to use the signal from the ion detector to identify a first monoisotopic cluster point, determine second and third isotopic cluster points as a function of the monoisotopic mass-to-charge ratio and intensity of the detected ions used to identify the first monoisotopic cluster point, apply a Gaussian fit over the first, second and third cluster points and fit a curve thereto, determine a fourth mass-dependent isotopic pattern point as a function of the curve fit, and automatically determine a material in the sample as a function of the first, second, third and fourth points and output a result characterizing the automatically determined material.

18. A method for automatically analyzing a sample via ion mass spectrometry, the method comprising:

detecting ions from the sample;

using the detected ions to identify a primary peak that corresponds to a mass of a particular material in the sample;

using the detected ions to identify a secondary peak that is a selected distance away from the primary peak;

subtracting an intensity from the secondary peak as a function of a predefined formula and adding the result to the primary peak via deconvolution to determine a resulting peak; and using the resulting peak and using a material characterization processor to automatically determine material in the sample and outputting a result characterizing the automatically determined material.

19. The method of claim 18, wherein detecting ions from the sample includes detecting ions in an electrospray ionization trap arrangement.

20. The method of claim 18, further comprising using the detected ions to identify a tertiary peak, wherein subtracting an intensity from the secondary peak as a function of a predefined formula and adding it to the primary peak via deconvolution to determine a resulting peak includes subtracting an intensity of the tertiary peak as a function of a predefined formula and adding the result to the primary peak via deconvolution to determine a resulting peak as a function of the primary, secondary and tertiary peaks.

21. The method of claim 18, wherein using the detected ions to identify a secondary peak that is a selected distance away from the primary peak includes identifying 18O peaks that are a mass difference of 2 Da and 4 Da apart in a mass spectrometry plot representing the detected ions.

22. The method of claim 18, wherein using the detected ions to identify a primary peak and a secondary peak respectively includes using the detected ions to identify peaks that correspond to a peptide mass, and wherein using the resulting peak to automatically determine material in the sample and outputting a result characterizing the automatically determined material includes determining a peptide material in the sample and outputting a result characterizing the peptide.

* * * * *

UNITED STATES PATENT AND TRADEMARK OFFICE

CERTIFICATE OF CORRECTION

PATENT NO. : 7,653,493 B1
APPLICATION NO. : 11/711140
DATED : January 26, 2010
INVENTOR(S) : Wang et al.

It is certified that error appears in the above-identified patent and that said Letters Patent is hereby corrected as shown below:

Col. 9, line 63: "monoisoptopic" should read --monoisotopic--.

Col. 15, line 41, Claim 3: "monoistopic" should read --monoisotopic--.

Signed and Sealed this
Seventeenth Day of May, 2011

David J. Kappos

*Director of the United States Patent and Trademark Office*